United States Patent [19]
Christianson et al.

[11] Patent Number: 5,424,088
[45] Date of Patent: Jun. 13, 1995

[54] STARCH-NATURAL GUM COMPOSITE COMPOSTIONS AS THICKENING AND SUSPENDING AGENTS

[75] Inventors: Donald D. Christianson; George F. Fanta, both of Peoria, Ill.

[73] Assignee: The United States of America as represented by the Secretary of Agriculture, Washington, D.C.

[21] Appl. No.: 991,811

[22] Filed: Dec. 17, 1992

[51] Int. Cl.[6] ............... A23L 1/05; A23L 1/0522; A23L 1/0524; A23L 1/0526

[52] U.S. Cl. ............... 426/578; 426/573; 426/575; 426/577

[58] Field of Search ............... 426/578, 573, 575, 577

[56] References Cited

U.S. PATENT DOCUMENTS

| | | | |
|---|---|---|---|
| 3,554,764 | 1/1971 | Yoder et al. | 99/101 |
| 3,930,052 | 12/1975 | De Brou et al. | 426/590 |
| 4,192,900 | 3/1980 | Cheng | 426/579 |
| 4,219,582 | 8/1980 | Cheng | 426/578 |
| 4,280,851 | 7/1981 | Pitchon et al. | 127/33 |
| 4,391,836 | 7/1983 | Chiu | 426/578 |
| 4,623,552 | 11/1986 | Rapp | 426/575 |
| 4,859,484 | 8/1989 | Bielskis et al. | 426/578 |
| 4,911,952 | 3/1990 | Doane et al. | 427/213.31 |
| 5,185,176 | 2/1993 | Chiu | 426/590 |

FOREIGN PATENT DOCUMENTS

| | | |
|---|---|---|
| 0366898 | 8/1989 | European Pat. Off. . |
| 294680 | 2/1954 | Switzerland . |

*Primary Examiner*—Jeanette Hunter
*Assistant Examiner*—Mary S. Mims
*Attorney, Agent, or Firm*—M. Howard Silverstein; Curtis P. Ribando; John D. Fado

[57] ABSTRACT

Starch and a minor amount of natural gum additive are processed together so that the polysaccharide components of each substance are completely dissolved in water, and the resulting blend is recovered. Upon drying, the blend produces a product which hydrates rapidly and which yields dispersions that are not only smooth and viscous, but also possess considerable lubricity. These products are useful in foods as thickening agents, suspending agents, and fat substitutes.

22 Claims, 2 Drawing Sheets

STARCH-NATURAL GUM COMPOSITE COMPOSTIONS AS THICKENING AND SUSPENDING AGENTS

BACKGROUND OF THE INVENTION

1. Field of the Invention

Aqueous starch dispersions have a number of practical applications as thickening agents, particularly in foods. Altering the rheological properties of starch dispersions would enhance the usefulness of starch in these areas. Also, the formation of rigid gels from cooked starch pastes is a major problem that limits the use of native unmodified starch in certain applications requiring storage after cooking. An effective method for reducing or eliminating this undesirable gelling, or changing the properties of these gels to make them more suitable for food applications, would greatly broaden the range of starch applications.

This invention relates to compositions of starch that have unique rheological and gelling properties. These properties are the unexpected result of: (1) the addition of minor amounts of natural gum to the system and (2) the cooking procedure, which renders both polysaccharides totally soluble, reduces polysaccharide molecular weight, and yields the most intimate mixture possible between starch and the natural gum additive.

2. Description of the Prior Art

Starch is a high molecular weight polymer composed of repeating 1,4-α-glucopyranosyl units (anhydroglucose units, or AGU) and is typically a mixture of linear and branched components. The linear component, amylose, has a molecular weight of several hundred thousand; while the molecular weight of the branched amylopectin is on the order of several million. Although normal cornstarch contains about 20–25% amylose, cornstarch varieties are available commercially that range in amylose content from 0% (waxy cornstarch) to about 70% (high-amylose cornstarch).

Starch occurs in living plants in the form of discrete granules ranging from about 5 to 40 microns in diameter, depending on the plant source. It is well known that starch, as isolated from the plant in its native state, is insoluble in water at room temperature because of strong hydrogen bonding between polysaccharide macromolecules. Areas of crystallinity within starch granules also inhibit water solubility. When a water suspension of granular starch is heated, granules at first slowly and reversibly take up water with limited swelling. Then, at a definite temperature, which is typically about 70° C., granules swell rapidly and irreversibly; and areas of crystallinity within the granule are lost. The temperature at which this occurs is commonly referred to as the gelatinization temperature.

Near the gelatinization temperature, a measurable percentage of the starch, in particular the amylose component, becomes soluble and diffuses out of the granule matrix and into the surrounding water. As the temperature is increased beyond about 70° C., a greater percentage of the starch becomes soluble, and the granules become highly swollen and partially disrupted, until, at a temperature of about 90°–100° C., a viscous dispersion of starch in water is obtained. However, despite this outward appearance of solubility, starch is only partially water soluble and exists largely as highly swollen granules and granule fragments that are easily separable from starch solution, for example, by centrifugation. In fact, when cornstarch is heated in water at 95° C., only about 25% of the starch actually dissolves, the remainder being present as swollen granules and granule fragments.

True solutions of starch in water, with no remaining granules and granule fragments are difficult to prepare using conventional cooking techniques, but can be readily prepared by passing starch-water slurries through a continuous steam jet cooker. Jet cooking has been used commercially for decades to prepare starch solutions for nonfood applications, for example, in the paper industry. The method involves pumping an aqueous starch slurry through an orifice where it contacts a jet of high-pressure steam. Unlike conventional cooking, which tends to preferentially solubilize the amylose component, steam jet cooking dissolves amylopectin as well as amylose. Somewhat higher starch concentrations than those desired in the final dispersion are used to allow for dilution of the cooked dispersions with condensed steam.

There are basically two types of starch jet cookers used commercially, and these are discussed in an article by R. E. Klem and D. A. Brogly, Pulp & Paper, vol. 55, page 98–103 (May 1981). The first of these provides a process that is referred to as thermal jet cooking. In this process, the amount of steam added to the aqueous starch slurry is carefully controlled to achieve complete steam condensation during the cooking process. No excess steam is used. The second of these provides a process that is referred to as excess-steam jet cooking. In excess steam jet cooking, the steam entering the heating zone of the cooker exceeds the amount required to reach the desired cooking temperature. This excess steam in the heating zone thus acts to produce mechanical shearing of the starch and rupture of polysaccharide molecules, especially those having the highest molecular weight. This not only leads to total and complete polysaccharide solubility but also to a lower apparent viscosity of starch, as compared with starch processed by either thermal jet cooking or conventional batch cooking.

An inherent property of starch pastes obtained by standard cooking proedures is their tendency to form firm, rigid gels on prolonged standing. The tendency of starch pastes to gel increases with the amylose:amylopectin ratio in the granule. It is generally accepted that gel formation, i.e., retrogradation, is caused by aggregation of starch molecules through hydrogen bonding. Retrogradation and aggregation of the amylose chains occurs more readily than with amylopectin, because amylose is a straight chain polymer with little or no branching. However, under refrigeration, amylopectin will also aggregate over time and will contribute to the gel-forming property of starch.

Although the formation of firm, rigid gels from cooked starch dispersions may be desirable for some end-use applications, the formation of gels of this type is often undesirable in foods because of the deterioration of gel structure during storage. Steam jet cooking is thus not generally used in the food industry, since a totally soluble starch is obtained that can subsequently retrograde to form a gel. Moreover, jet cooked starch solutions that have been dried are often difficult to redisperse in water and generally do not yield lump-free pastes having the smooth consistency required for food applications.

Natural gums are plant are microbial polysaccharides or their derivatives that can be readily dispersed in either cold or hot water to produce viscous solutions [R. L. Whistler, in Encyclopedia of Polymer Science and Technology, vol. 11, page 403 (1969)]. Examples of natural gums that are widely used industrially are the seaweed polysaccharides such as carrageenan, the exudate gums such as gum arabic and tragacanth, the seed gums such as guar and locust bean, the microbial polysaccharides such as xanthan, and certain polysaccharide derivatives such as carboxymethyl cellulose (CMC). Although natural gums are widely used in the food industry as thickeners and as suspending agents, gums are expensive relative to starch; and they often must be imported from other countries, thus creating an uncertain source of supply.

References to starch-natural gum mixtures exist in the prior art, for example, U.S. Pat. Nos. 3,554,764; 4,192,900; 4,219,582; and 4,623,552. These mixtures have all been prepared by conventional cooking procedures, which do not produce a totally water-soluble starch. The usefulness of these prior art compositions as food additives is thus limited to freshly cooked preparations; since drying these compositions typically yields products that not only are difficult to redisperse in water but also produce lumpy rather than smooth dispersions.

U.S. Pat. No. 4,859,484 describes a 50:50 mixture of starch and a hydrocolloid gum such as guar. These compositions are prepared by: (1) hydrating each polysaccharide component separately with 0.7–2.0 parts of water for the starch and 0.2–2.0 parts of water for the hydrocolloid gum, (2) initimately mixing the two polysaccharides, and (3) passing the mixture through an extruder at elevated temperatures. Processing was carried out at the lowest possible level of added water and under conditions that cause minimum shear-induced and temperature-induced degradation of the final product. Starch was thus not totally solubilized in the process. Also, final products contain equal amounts of starch and hydrocolloid gum. There is no data in this patent to suggest and dramatic effect of a hydrocolloid gum additive, particularly guar, on the properties of starch when the polysaccharide of the system is totally solubilized and partially degraded.

Extrusion cooking of polysaccharides at high solids contents, as described in U.S. Pat. No. 4,859,484, provides a polysaccharide melt. References to the formation of starch melts are common in the published literature [see for example, Colonna et al., Journal of Cereal Science vol. 1, pages 115–125 (1983); and Stepto & Tomka, Chimia, vol. 41, pages 76–80 (1987)]. Evidence for melt formation in U.S. Pat. No. 4,859,484 is the observation that the semisolid, molten extrudate expands as it exits the extruder die and then rapidly hardens to form a rigid solid as the melt cools. Solidification of the melt on cooling is sufficiently rapid to allow the extrudate to be cut into small sections for further drying.

Starch melts having high water contents such as those formed in U.S. Pat. No. 4,859,484 shows glass transition temperatures ($T_g$) that are not far above room temperature. Since annealing and reassociation of starch macromolecules occurs at temperatures above $T_g$, the solubilities of extruded starch products tend to decrease on standing. An explanation of the effect of $T_g$ on starch properties is given in a chapter by Colonna et al. in "Extrusion Cooking," C. Mercier, P. Linko, and J. M. Harper, eds., American Association of Cereal Chemists, Page 262 (1989). In contrast, dried products prepared by the present invention are characterized by a low moisture content (about 5% or below) and a $T_g$ considerably above room temperature. As a result of the high $T_g$ the annealing of starch to form insoluble products is less likely to occur.

We are also aware of European Patent Application EP 366,898 (May 9, 1990) in which aqueous slurries of high amylose starch were jet cooked, apparently via the thermal jet cooking process, and solutions were then spray dried without allowing the steam pressure in the cooking system to be released. Unlike our process, starches were essentially undegraded, and they dispersed readily in water, yielding firm gels on standing. Although mixtures of starch and polygalactomannan gum were also processed in this manner, properties of these compositions were not dispersed. Also, there was no suggestion of the unique properties that can be configured upon starch by hydrocolloid gum additives, particularly guar, when excess-steam jet cooking is used and when solutions are drum dried at atmospheric pressure.

SUMMARY OF THE INVENTION

Our invention is based on the discovery that a substantially dry starch composition having unique and unexpected properties can be produced by (1) dispersing starch and a natural gum additive, in a weight ratio ranging from about 99:1 to about 90:10, in water (2) processing the resulting dispersion to solubilize and intimately mix the polysaccharides and to cause a significant molecular weight reduction in the highest molecular weight polysaccharide components, and (3) drying the resulting solution of intimately mixed polysaccharides, for example, by use of a drum drier.

When the compositions of this invention are placed in water, they hydrate rapidly and yield dispersions that are not only smooth and viscous, but also possess considerable lubricity, thus making them suitable for use in foods as thickening agents, suspending agents, and fat substitutes. Moreover, aqueous dispersions of certain blends show little or none of the undesirable tendency of cooked starches to form rigid gels on standing or to exude water (i.e., synerese) when frozen and thawed.

DETAILED DESCRIPTION OF THE INVENTION

Figure 1:
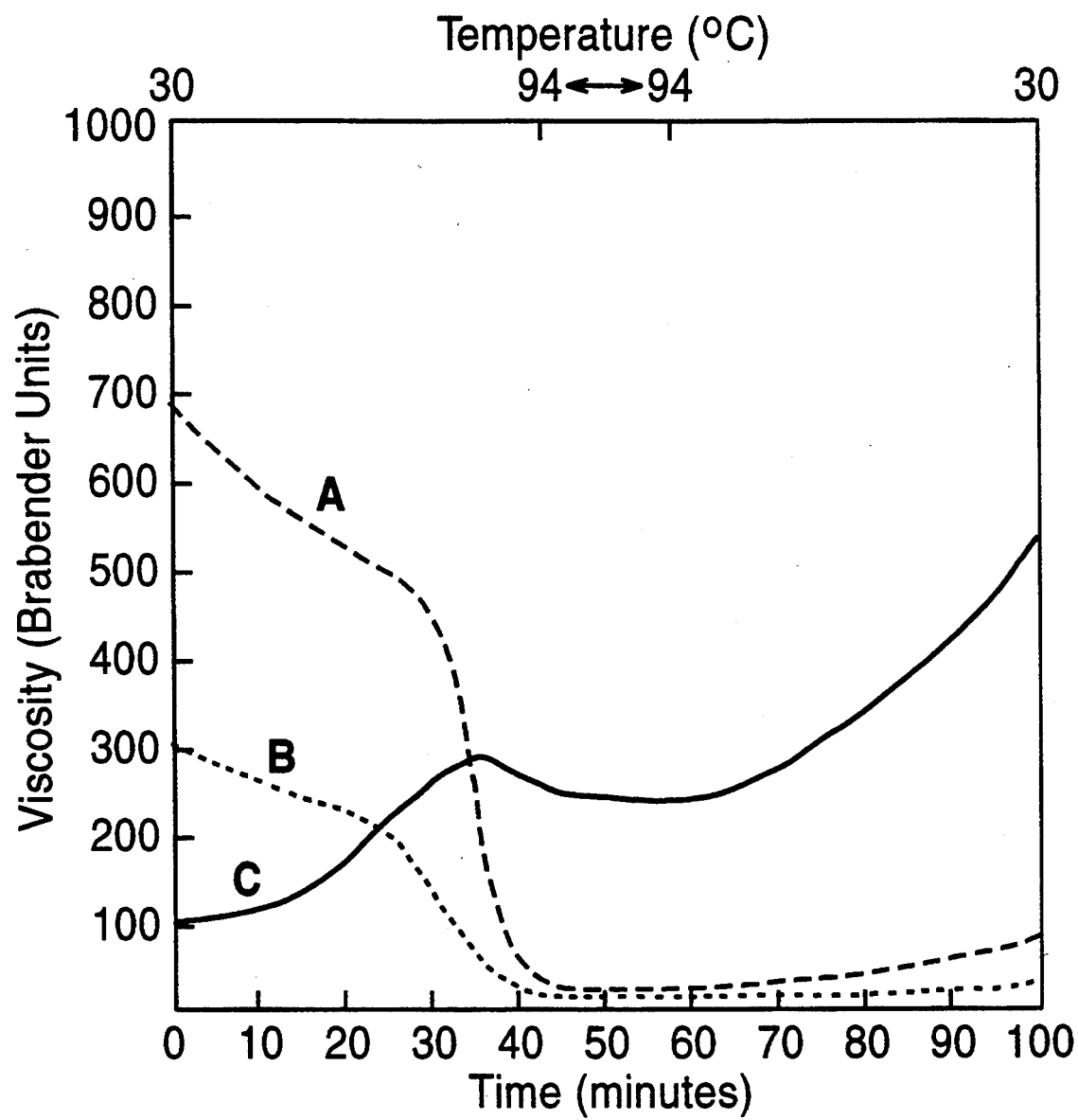
FIG. 1 is a series of plots illustrating the effects of guar gum addition and cooking conditions on the viscosity of cornstarch as a function of time and temperature.

The compositions of this invention are preferably prepared from unmodified starches obtained from cereal grains, such as corn, wheat, or rice, or from root crops such as potato or tapioca. Differences in branching and molecular weight can cause differences in physical properties between starches and starch derivatives derived from roots and tubers and those obtained from the cereal grains. An unmodified starch is one that has not been altered by chemical treatment or reduced in molecular weight by reaction with acids or enzyme. Unmodified starches are less costly than modified starches, and their use in foods is less restrictive because they have never been treated with potentially toxic chemicals. Modified starches may be used, however, to prepare the compositions of this invention, if certain properties are desired that are not obtainable with unmodified starches. Starches from a particular plant variety having amylose and amylopectin components in varying proportions may also be used, for example, waxy cornstarch and cornstarch having an amylose content greater than the 25% that is normally observed. However, high amylose cornstarch with an amylose content of 70% yields a composition that affords grainy dispersions when an attempt is made to disperse the composition in water. In the most preferred embodiments of the invention, the amylose content of the starch is less than 35%.

Any of the natural gums previously described are useful in the compositions of this invention. Guar gum, derived from the seed of the guar plant, is produced and marketed in large quantities, and is a preferred gum for use herein. Guar gum, as well as locust bean gum, is a galactomannan and is composed of mannopyranose units linked $\beta$-D-(1→4), with $\alpha$-D-galactopyranose units attached to the chain by (1→6) linkages.

Compositions of the invention are prepared from starch and natural gum in weight ratios ranging from about 99:1 to about 90:10. The upper limit for the natural gum content of the final composite composition is dictated by the high viscosities of natural gums in water and also by their expense relative to starch. For example, polysaccharide mixtures containing 10% or more of guar, based on starch, are difficult to disperse in water, and their high viscosities at a typical polysaccharide concentration of about 10–15% in water makes is difficult to pump them through a steam jet cooker.

Preferred compositions, based on ease of preparation and product properties, contain starch and natural gum in weight ratios ranging from about 97:3 to 95:5. Due to the minor amounts of natural gum in our compositions relative to starch and the dramatic changes in starch properties imparted by this small amount of gum, the natural gum portion of our composition can more properly be referred to as a starch additive rather than as a full-fledged component of a polysaccharide mixture. Webster's Third New International Dictionary defines "additive" as a substance added to another in relatively small amounts to impart and improve desirable properties or suppress undesirable properties.

Different methods may obviously be used to prepare solutions of starch and natural gum additives that are subsequently dried to form the polysaccharide compositions of this invention. In one such method, starch and natural gum additive are first dispersed separately in water. The two polysaccharide dispersions may then be either combined prior to solubilizing or else solubilized separately and the two solutions combined after the cooling operation. The preferred method for preparing starch-additive solutions is to first intimately blend starch and natural gum in the substantially dry state, i.e., in the absence of added solvent, and to then add this two-component polysaccharide blend to water with rapid stirring. The predominance of granular, unmodified starch in the substantially dry polysaccharide blend and the low percentage of natural gum in the blend makes it possible to add the blend to rapidly stirred water without the formation of lumps from the natural gum. As previously mentioned, the polysaccharide concentration in the aqueous dispersion will preferably be in the range of about 10–15%, though concentrations as high as about 20% are possible at low gum:starch ratios.

It is contemplated that dispersions having polysaccharide concentrations as low as about 1% can be processed in accordance with the invention. Of course, the lower the solids level, the greater the amount of water which must be removed during recovery. The water dispersion of polysaccharides is then immediately processed to obtain an intimately mixed polysaccharide solution, which is subsequently dried.

Processing of the water dispersion of polysaccharides is preferably carried out with an excess-steam jet cooker [see R. E. Kelm and D. A. Brogly, Pulp & Paper, vol. 55, pages 98$\psi$103 (May 1981)] under conditions necessary to attain complete disruption of starch granules and complete solution in water of both the natural gum additive and the amylose and amylopectin components of starch. We believe that the unique physical properties of the products of the invention are due not only to the fact that both the starch and the natural gum additive are rendered totally water soluble by the cooking operation, but also to the partial molecular breakdown of the starch. Although jet cooking conditions may be varied by one skilled in the art according to the particular starch variety and natural gum used, preferred cooking conditions for these compositions are in the range of about 130°–150° C. with a steam pressure of about 20–50 psig within the cooker and a pumping rate of about 0.75–2.0 liters per min. Typical conditions are 140° C. with a steam pressure of 40 psig and a pumping rate of1.1 l/min. Line pressure steam entering the cooker to achieve such conditions would be 65 psig. The ratio of polysaccharide components, solids concentration and conditions of cooking are all selected so that the dispersion remains a free-flowing, nonthermoplastic fluid. It is obvious that higher line pressures and higher steam pressures within the cooker will cause a higher level of molecular breakdown of the component polysaccharides. Steam pressure may thus be varied to alter the physical properties of the final product.

It will be obvious to anyone skilled in polysaccharide chemistry that the pH of the aqueous dispersion of starch and natural gum additive during jet cooking and drum drying will influence the viscous properties of these compositions when they are used in applications such as foods. As the pH during processing is lowered, the polysaccharides will incur increasing amounts of acid-induced hydrolytic degradation. This will lead to lower viscosities and also perhaps to a reduced tendency toward gel formation. One skilled in the art can thus prepare a variety of different compositions from the same blend of starch and natural gum by simply varying the pH over a wide enough latitude during jet cooking and drum drying. For most applications, however, a pH within the 6–7 range during processing is preferred.

Although the polysaccharide solutions resulting from jet cooking may obviously be used as thickening agents, suspending agents, and fat substitutes without drying, economics dictate that these solutions be dried and marketed as substantially dry powders. Although drying may be carried out by any method known to those skilled in the art, drum drying is the preferred method. Spray drying is an obvious alternative to drum drying, although spray drying would be expected to yield particles more spherical in shape and having a different density than those produced by drum drying. Although drying conditions may vary, typical drum drying conditions for starch-guar gum compositions are 60 psig steam pressure within the drums and a drum rotation rate of 4 ppm. Dry compositions may then be ground, milled, or pulverized to any desired particle size.

As previously stated, the dried compositions of this invention have unique properties. They hydrate rapidly and yield dispersions that are not only smooth and viscous, but also possess considerable lubricity. These products are suitable for incorporation into a variety of food compositions together with other food substances. Without limitation thereto, such compositions include sour cream, yoghurt, ice cream, cottage cheese, cake mixes, and the like. The starch-hydrocolloid products are also useful emulsifiers, particularly for vegetable oil and water emulsions. For example, an aqueous dispersion of wheat starch-guar product at 10% solids is capable of emulsifying levels of corn oil up to about 35%. The resulting emulsion is smooth and spreadable and has many of the characteristics of margarine. One application of this imitation margarine is as a shortening substitute in low-fat, dietary baked product formulations.

Experiment Set A

The unique viscosity behavior of water dispersions of the compositions of this invention may be seen by examining such a composition prepared from cornstarch containing 5% guar gum additive, based on starch, and by comparing the results with suitable control compositions. To prepare the composition of this invention, starch and guar were first blended together in the substantially dry state and then dispersed in water with vigorous stirring. The dispersion, containing a total of 400 g of polysaccharide in 3 liters of water, was passed through an excess-steam jet cooker operating at 285° F. with a steam pressure of 40 psig within the cooker. Line pressure steam entering the cooker was 65 psig. The hot, jet cooked solution was then drum dried and ground to a fine powder containing about 5% moisture.

Slow addition of 30 g (dry weight basis) of this powder to 500 ml of rapidly stirred water at room temperature yielded a smooth viscous dispersion that exhibited considerable lubricity when rubbed between the fingers. The viscosity of this dispersion at various temperatures was then measured with a viscoamylograph manufactured by C. W. Brabender Instruments, Inc. An apparatus of this type is widely used in the food industry to characterize aqueous polysaccharide dispersions. Dispersions are stirred in the viscoamylograph, heated at 1.5° C. per min to 94° C., held at this temperature for 15 min, and finally cooled to 30° C. Viscosities throughout the heating and cooling cycle are measured in arbitrary Brabender Units (BU) and are recorded as a function of time and temperature.

FIG. 1, Curve A, shows the viscosity, as a function of time and temperature, of the cornstarch composition containing 5% guar prepared by jet cooking and drum drying according to our invention. Curve B was obtained for a similarly prepared control composition that contains no guar. Finally, Curve C shows the results obtained for a cornstarch control composition containing 5% guar prepared by cooking a water dispersion of the two polysaccharides in the conventional manner in a stirred reactor for 30 min at 90°–92° C. and then drum drying the resulting dispersion. The behavior of the composition prepared according to this invention and the two control compositions prepared for comparison may be summarized as follows:

For the jet cooked and drum dried cornstarch composition containing 5% guar additive (Curve A), the initial viscosity at 30° C. is almost 700 BU; however, the viscosity drops sharply on heating, reaching a value of 30 BU at 94° C. When the temperature of the heated dispersion is lowered again to 30° C., some viscosity increase is observed; however, the final viscosity at 30° C. is only about 90 BU. Setback of the starch on cooling is therefore minimal. When the heated and cooled dispersion is allowed to stand for 20 hr at either room temperature or at 5° C., the dispersion remains smooth, viscous, and lump free and shows no tendency to form an undesirable rigid gel that is typical of starch products. Brookfield viscosity (30 rpm) of the dispersion within 30 min after removing from the Brabender viscoamylograph was 395 cp (#2 spindle). After the dispersion had stood for 20 hr at room temperature, Brookfield viscosity was 1310 cp (#3 spindle). After 20 hr at 5° C., the Brookfield viscosity was 2060 cp (#3 spindle).

For the conventionally cooked and drum dried cornstarch control composition containing 5% guar (Curve C), the starting viscosity at 30° C. is low (100 BU). The viscosity rises to 240 BU when the dispersion is heated to 94° C., and a further viscosity increase to 530 BU is observed when the dispersion is cooled back to 30° C. Considerable setback of the starch therefore occurs on cooling. The viscosity of the heated and cooled dispersion, measured 10 min after removal from the Brabender viscoamylograph, was 7000 cp (30 rpm, #4 spindle). Dispersions stored for 20 hr at either room temperature or 5° C. formed firm gels on standing. These gels afforded lumpy dispersions when mixed with a spatula and are thus not suitable for many food applications.

For the jet cooked and drum dried cornstarch composition containing no guar gum (Curve B), the starting viscosity of 300 BU at 30° C. decreased to about 20 BU on heating to 94° C. and then increased again to about 40 BU on cooling back to 30° C. The viscosity of the heated and cooled dispersion, measured 1.5 hr after removal from the Brabender viscoamylograph, was 770 cp (30 rpm, #2 spindle). Dispersions stored for 20 hr at either room temperature or 5° C. formed gels on standing. These gels gave lumpy dispersions when stirred with a spatula and are thus not suitable for many food applications.

Comparison of the three curves in FIG. 1, and also the behavior of the final dispersions after removing them from the viscoamylograph and allowing them to stand for a prolonged period of time, clearly shows the unexpected nature of the properties one obtains when starch is first jet cooked with a low percentage of natural gum additive, and the intimately mixed polysaccharide solution is then drum dried. When the jet cooked sample with 5% guar (Curve A, FIG. 1) is compared with the jet cooked sample with 0% guar (Curve B), it is apparent that 5% guar in the polysaccharide sample increases the viscosity throughout the entire heating and cooling cycle. In addition to these viscosity increases, the unexpected nature of our results may be seen in the behavior of the two samples on prolonged standing. Although one would intuitively expect that the highest viscosity sample would also yield the firmest gel on standing, exactly the opposite behavior is observed. The high viscosity sample containing 5% guar gum additive (Curve A) does not gel at all but remains soft, smooth, and fluid after 20 hr at either room temperature or 5° C. However, the low viscosity sample containing no guar sets up to a firm gel that forms lumps when stirred with a spatula, making the product unsuitable for many uses in foods.

Comparison of the product of this invention prepared by excess-steam jet cooking with the control composition prepared by cooking cornstarch with 5% guar in the conventional manner (Curve C) also shows the unexpected nature of the product properties that result from the invention. That the unique properties of the product of the invention are not simply due to the presence of 5% guar in the system is clearly shown by the dramatic differences in shape between Curves A and C of FIG. 1, and also by the dramatic difference in behavior between the two heated and cooled dispersions on standing. That the unique properties of the product of the invention are not simply due to the jet cooking process is clearly shown by the dramatic difference in behavior on prolonged standing between jet cooked and drum dried starch with 5% guar gum additive and jet cooked and drum dried starch with 0% guar. It is thus apparent that both the presence of the natural gum additive in the system and also the use of appropriate cooking conditions to obtain some reduction in polysaccharide molecular weight, in addition to an intimate solution of the two polysaccharides before drying, are essential to prepare the products of this invention. Moreover, these factors act together in a synergistic fashion to give the unique properties observed.

Experiment Set B

A second set of control experiments shows that the unique properties of our compositions result from the combined action of temperature, pressure, and mechanical shear that are characteristic of excess-steam jet cooking and are not simply due to the fact that cooking was carried out at temperatures greater than 100° C. In the first of these experiments, an unstirred aqueous suspension of cornstarch containing 5% guar gum, based on starch, was heated in an autoclave at 30 psig steam pressure (132° C.) for 1 hr totally dissolve the polysaccharides. The resulting viscous solution was then drum dried and ground to a fine powder containing about 5% moisture. In the second experiment, an identical cornstarch-5% guar gum dispersion was prepared; however, the dispersion was jet cooked at a steam pressure of 30 psig and was then drum dried and ground as in the first experiment. Therefore, even though both samples were processed at the same temperature, the polysaccharides in the second experiment were subjected to the combined effects of temperature, pressure, and mechanical shear that occur within the excess-steam jet cooker.

Figure 2:
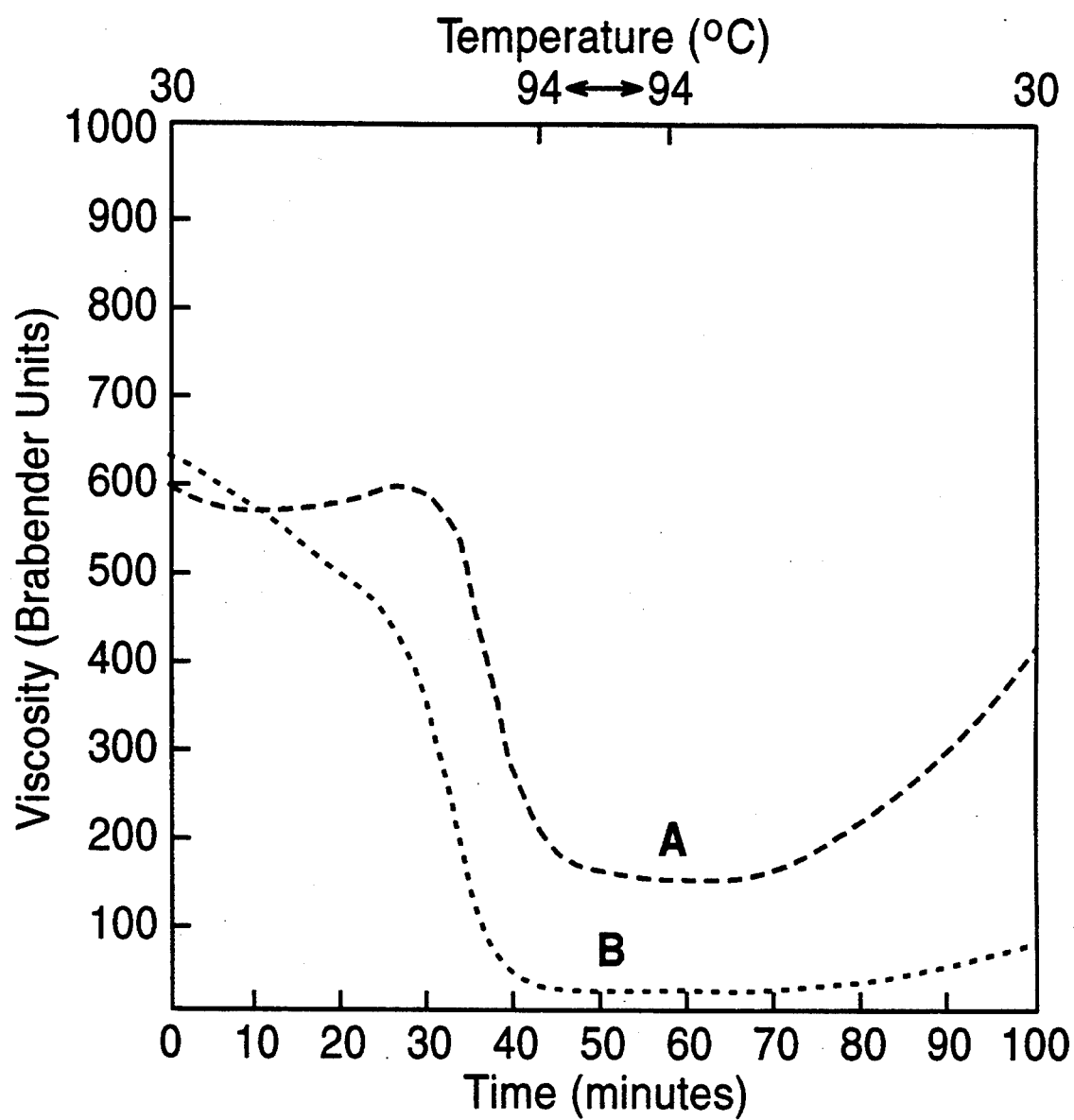
FIG. 2 is a pair of plots illustrating the combined effect of temperature, time, and mechanical shear on a cornstarch dispersion containing 5% guar gum.

Dispersions were next prepared by adding 30 g (dry weight basis) of either the drum dried and ground autoclaved composition or the drum dried and ground jet cooked (30 psig) composition to 500 ml of rapidly stirred water. Viscosities at various temperatures were then measured with the Brabender viscoamylograph as described earlier. Results are shown in FIG. 2. Curve B shows the viscosity vs time/temperature curve for the jet cooked composition. This curve is quite similar to Curve A of FIG. 1. When samples of the heated and cooled dispersion from the Brabender viscoamylograph were allowed to stand for 20 hr at either room temperature or 5° C., the dispersions remained smooth and free of gel. Brookfield viscosities (30 rpm, #4 spindle) of samples stored at room temperature and at 5° C. were 2460 cp and 4120 cp, respectively.

Curve A of FIG. 2 shows the Brabender viscosity vs time/temperature curve for the composition prepared by autoclaving the polyaccharides in water at 30 psig. Although the starting viscosity for the autoclaved composition is similar to that of the jet cooked sample represented by Curve B, the viscosity of the autoclaved composition is appreciably higher throughout most of the heating and cooling cycle. Also, the large viscosity increase on cooling, i.e., setback, is comparable to that observed for the conventionally cooked starch-guar composition represented by Curve C of FIG. 1. When the heated and cooled autoclaved composition from the Brabender amylograph was allowed to stand for 20 hr at either room temperature or 5° C., stiff gels were obtained. These gels afforded lumpy dispersions when stirred with a spatula and are thus not suitable for many food applications.

Experiment Set C

Although guar is the preferred natural gum for the preparation of the compositions of this invention, other gums may also be used as starch additives. For example, compositions comprising cornstarch with 5% natural gum additive were prepared from xanthan gum, locust bean gum, carrageenan, carboxymethyl cellulose, and konjac. As in the case of compositions containing the guar additive, water dispersions of polysaccharides were subjected to excess-steam jet cooking, the cooked solutions were drum dried, and the dried products were ground to fine powders containing about 5% moisture. Dispersions were then prepared by adding 30 g (dry weight basis) of each substantially dry powder to 500 ml of rapidly stirred water. Dispersions were then heated and cooled in the Brabender amylograph as described earlier. Samples of each heated and cooled dispersion were finally allowed to stand for 20 hr at either room temperature or 5° C.

Although Brabender viscosity vs time/temperature curves did not show large differences between starch compositions containing the guar additive and those containing the other natural gum additives, major differences between the compositions were apparent when dispersions were allowed to stand for 20 hr. Unexpectedly, konjac was the only natural gum additive that behaved in a manner similar to guar, i.e., it produced a starch dispersion that did not gel, even after standing for 20 hr at 5° C. Cornstarch dispersions that contained the other natural gum additives formed soft gels on standing.

A gel is defined as a crosslinked polymer network swollen in a liquid medium [T. Tanaka, In Encyclopedia of Polymer Science and Engineering, vol. 7, John Wiley & Sons, page 514 (1987)]. Whereas some gel-forming polymers are crosslinked chemically by covalent bonds, other gels, e.g., those formed from starch and other polysaccharides, are formed from polymers that are physically crosslinked through hydrogen bonding. While not wishing to be limited by any definite theory, we feel that natural gum additives become hydrogen bonded to starch when a dispersion thereof is subjected to conditions characteristic of excess-steam jet cooking and drum drying. Natural gum additives thus interfere with the normal hydrogen bonding and gel-forming properties of starch. The extent of hydrogen bonding that occurs between starch and gum appears to be highly dependent upon the chemical structure of the natural gum additive. Moreover, the effect of a particular gum on the extent of starch gelation is at the present time totally unpredictable. For example, even though guar gum and locust bean gum are both galactomannans and differ only in the frequency of galactose substitution, guar is the only galactomannan additive that inhibits starch gelation. It is also surprising that konjac, which is a glucomannan, similarly suppresses the gel-forming properties of cornstarch.

Although starch compositions that gel are unsuitable for many food applications, we recognize the fact that gel formation is a desirable property in some foods. The usefulness of gel-forming, starch-based compositions in various foods will of course depend on the physical properties of the gel, for example, gel rigidity and gel texture and stability to storage. We have made the qualitative observation that gels produced from starches that contain natural gum additives in accordance with this invention appear to have a different texture and rigidity than gels produced from starch alone. This might make these additive-containing starch compositions more useful than starch itself for some food applications.

The following examples further illustrate the invention but should not be construed as limiting the invention, which is defined by the claims.

EXAMPLE 1

This example evaluates the effect of various weight ratios of cornstarch and guar gum additive on the properties of products prepared in accordance with the invention.

The cornstarch used was "Buffalo 3041" from CPC International, Inc. This starch has a normal amylose:amylopectin ratio of about 25:75 and a moisture content of about 10%. Finely powdered guar gum with a moisture content of 11.4% was obtained from Continental Colloids, Inc. Weights of cornstarch and guar were calculated on a dry weight basis.

For compositions containing 0, 1, 3, 5, and 10% guar, the following dry weights of starch/guar, in grams, were combined and dry-blended by means of a Waring blender: 0%: 400/0; 1%: 396/4; 3%: 388/12; 5%: 380/20; 10%: 360/40. The substantially dry starch-guar blends were then slowly added to 3 liters of rapidly stirred water. When swollen lumps of guar gum were observed, these could be easily dispersed by briefly stirring the aqueous dispersion in a Waring blender. The pH was then adjusted to 7 by dropwise addition of 0.7N NaOH.

Polysaccharide dispersions were then passed through a Penick & Ford laboratory model continuous steam jet cooker operated with 65 psig line pressure steam. Cooking was carried out at 140° C. (285° F.) with a steam pressure of 40 psig within the cooker. Pumping rate of the starch slurry through the cooker was about 1.1 liters per min. Cooked solutions were collected in Dewar flasks and were then poured onto a double-drum drier, 18 in × 12 in diameter, heated with 60 psig steam and rotating at about 4 rpm. The flake-like products were ground in a Retsch mill equipped with a 1-mm screen. Final products had moisture contents of about 4-7%.

The drum dried and ground compositions were then dispersed in water so that the viscous properties of aqueous dispersions could be studied as a function of time and temperature. Thirty grams of each composition (dry weight basis) was slowly added to 500 ml of rapidly stirred water, and stirring was continued until a substantially smooth dispersion was obtained. The dispersion was then transfered to the sample cup of a fiscoamylograph (model VA-1B, C. W. Brabender Instruments, Inc.). The sample, stirred at 75 rpm, was heated at 1.5° C./min to 94° C., held at 94° C. for 15 min, and cooled at 1.5° C./min back to 30° C. Viscosities, in arbitrary BU, were continuously recorded as a function of time and temperature.

Cooled dispersions were recovered from the viscoamylograph cup, and the pH was determined at 25° C. Samples were then poured into 150-ml beakers and allowed to stand for 20 hr at room temperature. A second sample of each dispersion was allowed to stand for 20 hr in a refrigerator at 5° C. Viscosities of these dispersions were then determined at 30 rpm with a Brookfield model LVT viscometer using the #3 and #4 spindles. The results are reported in Table I.

EXAMPLE 2

This example evaluates the effect of the starch type on the product properties.

Cornstarch was the same "Buffalo 3401" used in Example 1. Waxy cornstarch, which is comprised entirely of amylopectin, was "Amioca" from National Starch and Chemical Corp. The high amylose cornstarch was "Amylomaize VII" ("AM-VII") from American Maize Products Co. This starch contains amylose and amylopectin in a weight ratio of about 70:30. Wheat starch was "AYTEX P" from Ogilvie Mills, Inc. Potato starch was from Sigma Chemical Co. Tapioca starch was from A. E. Staley Mfg. Co. Guar gum was the same used in Example 1. Starches contained about 10% moisture, and all polysaccharide weights were calculated on a dry weight basis.

For compositions containing 5% guar gum, 400 g of starch was dry-blended with 20 g of guar gum, as in Example 1. For compositions containing 0% guar, 400 g of starch was used. The starch or starch-guar blend was then dispersed in 3 liters of water, and the pH was adjusted to 7. With the exception of Example 2C, in which jet cooking was performed at 30 psig, steam jet cooking was carried out as in Example 1. Drum drying, grinding, and the investigation of the viscous properties of the products using the Brabender viscoamylograph and Brookfield viscometer were carried out as in Example 1. The results are reported in Table II.

EXAMPLE 3

This example evaluates the effect of the type of natural gum additive on the product properties.

Finely powdered samples of xanthan gum ("X-90"), locust bean gum, carrageenan ("CCSS-2"), and carboxymethyl cellulose (CMC, "7HC4F") were obtained from Continental Colloids, Inc. Konjac gum was "Nutricol K80V" from FMC, Inc. The natural gums had moisture contents on the order of 8-13%. The cornstarch used was the same "Buffalo 3401" used in Example 1. All polysaccharide weights were calculated on a dry weight basis.

A dry blend of 400 g of cornstarch and 20 g of natural gum additive was dispersed in 3 liters of water, the pH was adjusted to 7, and the dispersion was steam jet cooked as in Example 1. Drum drying, grinding, and the investigation of the viscous properties of the products using the Brabender viscoamylograph and Brookfield viscometer were carried out as in Example 1. The results are reported in Table III.

EXAMPLE 4

This experiment describes the effect of pH on the viscosities of aqueous dispersions of cornstarch containing 5% guar gum additive and wheat starch containing 5% guar gum additive. Results are shown in Table IV.

Compositions were prepared as in Example 2, and Brabender viscoamylographs were run as in Example 1. Cooled dispersions were recovered from the viscoamylograph sample cup and were divided into two portions. One portion received no pH adjustment; whereas, the other portion was acidified to pH 4.2–4.6 with a few drops of 0.5N HCl. Each of these dispersions was further divided in half, and these portions were allowed to stand for 20 hr at either room temperature or in a refrigerator at 5° C. Brookfield viscosities were then determined as in Example 1. As seen in Table VI, acidification resulted in only minor changes in viscosity.

EXAMPLE 5

This example shows the reduction in starch molecular weight, as measured by intrinsic viscosity, that results from passing a starch-water slurry through the excess-steam jet cooker used to prepare the compositions of this invention.

A 6.67% solids slurry of waxy cornstarch in water, buffered to pH 7.2, was passed through a Penick & Ford laboratory model continuous steam jet cooker operating under the conditions cited in Example 1. Due to dilution of the starch slurry with condensed steam, the solids content of the cooked solution was 5%. The pH of the cooked starch solution was 6.9. Dilute solutions of the cooked starch were prepared in 0.33M KCl containing 0.2% sodium azide, to protect the starch from microbial degradation. The intrinsic viscosity of the jet cooked starch was then determined. Values for intrinsic viscosity were 79 and 74 cc/g in two repeat determinations.

The intrinsic viscosity of uncooked waxy cornstarch was determined by dissolving the starch in 1 KOH, neutralizing with 1M HCl and then preparing dilute solutions in 0.33M KCl containing 0.2% sodium azide. The intrinsic viscosity observed for uncooked waxy cornstarch was 150 cc/g.

EXAMPLE 6

This example describes the compositions used to obtain the Brabender viscoamylograph data in FIG. 1.

The composition used to obtain Curve A is described in Example 1D. The compositions of Examples 2A and 2B gave Brabender amylograph curves that were not greatly different than Curve A.

The composition used to obtain Curve B is described in Example 1A.

The composition used to obtain Curve C was prepared as follows. A substantially dry intimate blend of 126.7 g (dry basis) of "Buffalo 3401" cornstarch and 6.67 (dry basis) of guar gum was dispersed in 1 liter of water, and the pH was adjusted to 7 as in Example 1. The resulting dispersion was transferred to a Readco steam jacketed sigma double arm mixer with 1-qt working capacity (Teledyne Readco, York, Pa.). The lid had an opening to accommodate a reflux condenser. The mixture was stirred and heated to 90° C. and was then stirred at 90°–92° C. for 30 min. The hot mixture was drum dried and ground as in Example 1. Viscous properties of the product were determined using the Brabender viscoamylograph and Brookfield viscometer as in Example 1.

EXAMPLE 7

This example describes the compositions used to obtain the Brabender viscoamylograph data in FIG. 2.

The composition used to obtain Curve B is described in Example 2C.

The composition used to obtain Curve A was prepared as follows. A dry blend of 400 g (dry basis) of "Buffalo 3401" cornstarch and 20 g (dry basis) of guar gum was dispersed in 3 liters of water, and the pH was adjusted to 7 as in Example 1. The resulting dispersion was divided in half, placed in two metal beakers and transferred to an American Sterilizer steam-heated autoclave, Model 57CR. The autoclave was pressurized to 30 psig with steam (132° C.) and held at this temperature and pressure for 1 hr. Steam was then replaced with compressed air, and the polysaccharide solution in the beakers was allowed to cool to approximately 90° C. over a period of about 1.5 hr. The viscous homogeneous solution was then drum dried and ground to a powder as in Example 1. The viscosity of the product was then determined as in Example 1 using the Brabender viscoamylograph.

EXAMPLE 8

This example demonstrates the absence of syneresis in aqueous dispersions of the compositions of this invention when they are frozen and thawed.

A drum dried and ground composition containing 5% guar additive, based on starch, was prepared as in Example 1D. Twenty grams of this composition was added to 180 ml of water in a Waring blander. The mixture was blended at medium speed for about 30 sec while periodically mixing with a spatula. The resulting dispersion was thick and creamy and exhibited considerable lubricity. When it was placed in the freezer and thawed, it exhibited no syneresis, i.e., no separation of liquid from dispersed solid, and the dispersion contained no trace of gel.

A jet cooked composition containing 5% guar additive was prepared as in Example 2B. The composition was not drum dried but was allowed to cool to room temperature. This dispersion contained 10.1% polysaccharide solids, as determined by freeze drying an accurately weighed portion of the dispersion. A sample of the cooled dispersion was allowed to stand for 20 hr at room temperature, and the Brookfield viscosity was measured. Although the sample was highly viscous (6520 cp, #4 spindle), it was extremely smooth and contained no trace of gel. A sample stored for 20 hr at 5° C. had a Brookfield viscosity of 7360 cp and was also smooth and free of gel. When a sample of the dispersion was subjected to two freeze-thaw cycles, it showed no syneresis, although the consistency changed to that of a soft, buttery semi-solid.

EXAMPLE 9

This example demonstrates the fat mimicking properties of a composition of this invention prepared from wheat starch and 5% guar gum additive.

A high-ratio white cake was prepared according to American Association of Cereal Chemists (AACC) method 10–90. The standard formulation is given below and contains 25.0 g of shortening. This formulation served as the control.

82.5 g cake flour
70.0 g sugar
6.0 g nonfat dry milk
1.5 g salt
2.9 g baking powder
4.5 g egg whites
25.0 g shortening 70.0 g water In the experimental cakes, the shortening was totally replaced with either 1.0, 1.5, or 2.0 g, dry weight basis, of the composition of Example 2H. The composition was sifted together with the other dry ingredients prior to batter formation. Two small cakes, scaled at 110 g each, were then baked from the control and each of the experimental formulations. Textures of experimental cakes were similar to the control, except that the crumb in the experimental cakes was firmer, heavier, and less tender. As the concentration of wheat starch-guar was increased, the texture became looser, leading to a foam bread type texture at the highest concentration of 2.0 g. Wheat starch containing 5% guar additive can therefore serve as a fat replacer without seriously disturbing the volume or texture of the cake, if 1.0 g or less of wheat starch-guar in the above formulation is used.

EXAMPLE 10

Emulsions of vegetable oil and water can be stabilized using starch-hydrocolloid products in the preparation of a low-fat imitation margarine. For example, when the wheat starch-guar product of Example 2H was dispersed in water at 10% solids, a microgel was formed which was capable of holding oil. When corn oil was added to this microgel at levels of 30–35%, the resultant products were smooth and spreadable. The emulsion remained stable under refrigeration and/or room temperature conditions during extended storage.

EXAMPLE 11

The imitation margarine prepared as described in Example 10 was substituted gram for gram for commercial margarine in the AACC lean cake recipe described in Example 9. The cake volume, softness and crumb made with the imitation margarine was similar to a control cake made with commercial margarine. The emulsion properties of the wheat starch-guar-water-oil mixture allowed formation of a cake crumb much different from the breadlike crumb usually produced when fat is replaced with starch products in cake formulas. The cake produced with the substitute margarine had 70% less fat than the control.

TABLE I

| Example | % guar | Brabender viscoamylograph data | | | | Brookfield visocisty (cp) after standing 20 hr, 30 rpm (# spindle) | |
|---|---|---|---|---|---|---|---|
| | | initial, 30C | BU, 94C | final, 30C | Final pH | Room temperature | 5C |
| 1A | 0 | 295 | 20 | 40 | 6.66 | gel | gel |
| 1B | 1 | 330 | 20 | 40 | 6.87 | 1530 (#3) | 1990 (#3) |
| | | | | | | 1660 (#4) | 2220 (#4) |
| 1C | 3 | 700 | 15 | 50 | 6.80 | 1370 (#3) | 2020 (#3) |
| | | | | | | 1540 (#4) | 2140 (#4) |
| 1D | 5 | 690 | 30 | 85 | 6.03 | 1310 (#3) | 2060 (#3) |
| | | | | | | 1500 (#4) | 2320 (#4) |
| 1E | 10 | 900 | 70 | 160 | 6.43 | 3340 (#3) | ... |
| | | | | | | 3820 (#4) | 5340 (#4) |

TABLE II

| Example | Starch variety | % guar | Brabender viscoamylograph data | | | | Brookfield viscosity (cp) after standing 20 hr, 30 rpm (# spindle) | |
|---|---|---|---|---|---|---|---|---|
| | | | BU, initial, 30C | BU, 94C | BU, final, 30C | Final pH | Room temperature | 5C |
| 2A | cornstarch | 5 | 620 | 33 | 85 | 6.69 | 1700 (#3) | 2550 (#3) |
| | | | | | | | 1900 (#4) | 2620 (#4) |
| 2B | cornstarch | 5 | 660 | 20 | 80 | 7.17 | 1680 (#3) | 2640 (#3) |
| | | | | | | | 1980 (#4) | 2780 (#4) |
| 2C* | cornstarch | 5 | 630 | 23 | 85 | 6.94 | 2130 (#3) | ... |
| | | | | | | | 2460 (#4) | 4120 (#4) |
| 2D | waxy corn | 5 | 65 | 20 | 52 | 7.09 | 336 (#3) | 472 (#3) |
| 2E | waxy corn | 0 | 25 | 25 | 25 | 6.98 | 56 (#3) | 92 (#3) |
| 2F | AM-VII | 5 | 50 | 42 | 160 | 7.08 | grainy paste | grainy paste |
| 2G | AM-VII | 0 | 45 | 10 | 90 | 7.02 | grainy paste | grainy paste |
| 2H | wheat | 5 | 480 | 15 | 70 | 6.49 | 1900 (#3) | 2450 (#3) |
| | | | | | | | 2460 (#4) | 2780 (#4) |
| 2J | potato | 5 | 290 | 45 | 130 | 6.39 | 712 (#3) | gel |
| | | | | | | | 800 (#4) | |
| 2K | tapioca | 5 | 100 | 30 | 90 | 6.82 | 320 (#3) | 340 (#3) |

*Composition was prepared by jet cooking with a steam pressure of 30 psig rather than 40 psig within the cooker.

TABLE III

| Example | Gum | Brabender viscoamylograph data | | | | Brookfield viscosity (cp) after standing 20 hr, 30 rpm (# spindle) | |
|---|---|---|---|---|---|---|---|
| | | BU, initial, 30C | BU, 94C | BU, final, 30C | Final pH | Room temperature | 5C |
| 3A | xanthan | 720 | 50 | 120 | 6.97 | soft gel | soft gel |
| 3B | locust bean | 560 | 30 | 100 | 6.95 | soft gel | soft gel |
| 3C | carrageenan | 260 | 0* | 30 | 6.42 | soft gel | soft gel |

TABLE III-continued

| Example | Gum | Brabender viscoamylograph data | | | | Brookfield viscosity (cp) after standing 20 hr, 30 rpm (# spindle) | |
|---|---|---|---|---|---|---|---|
| | | BU, initial, 30C | BU, 94C | BU, final, 30C | Final pH | Room temperature | 5C |
| 3D | CMC | 470 | 20 | 90 | 7.22 | soft gel | soft gel |
| 3E | konjac | 690 | 20 | 90 | 6.80 | 1290 (#3) 1260 (#4) | 2060 (#3) 2240 (#4) |

*Viscosity is too low to measure with the viscoamylograph.

TABLE IV

| Starch variety | % guar | Brookfield viscosity (cp) after standing 20 hr, 30 rpm (# spindle) | | | | | |
|---|---|---|---|---|---|---|---|
| | | No pH adjustment | | | Acidified | | |
| | | pH | Room temperature | 5C | pH | Room temperature | 5C |
| cornstarch | 5 | 6.69 | 1700 (#3) 1900 (#4) | 2550 (#3) 2620 (#4) | 4.60 | 1490 (#3) 1600 (#4) | 2310 (#3) 2320 (#4) |
| wheat | 5 | 6.49 | 1900 (#3) 2460 (#4) | 2450 (#3) 2780 (#4) | 4.21 | 1680 (#3) 1980 (#4) | 2500 (#3) 2840 (#4) |

We claim:

1. A composition comprising a water-solubilized blend of polysaccharide components of starch and of a natural gum resulting from excess-steam jet cooking of said starch and gum, wherein the starch polysaccharide components:natural gum polysaccharide components dry weight ratio is in the range of about 99:1 to about 90:10.

2. A composition as described in claim 1 wherein said starch is un unmodified starch.

3. A composition as described in claim 1 wherein said natural gum is selected from the group consisting of guar gum and konjac gum.

4. A composition as described in claim 1 wherein said natural gum is selected from the group consisting of xanthan gum, locust bean gum, carrageenan, and carboxymethyl cellulose.

5. A composition as described in claim 1 wherein said blend is an aqueous dispersion.

6. A composition as described in claim 1 wherein said blend is a dry solid.

7. A composition as described in claim 1 and further comprising a food substance other than said blend.

8. A composition as described in claim 7 wherein said food substance is a vegetable oil.

9. A method for producing a polysaccharide product from an unmodified starch and a natural gum comprising the following steps:
   (a) dry-mixing the starch and the natural gum in a starch:gum ratio in the range of about 99:1 to about 90:10;
   (b) admixing the resultant dry mix with water to form an aqueous mixture;
   (c) excess steam jet-cooking the aqueous mixture under conditions whereby the polysaccharide components of both the starch and the natural gum are intimately mixed to form a soluble aqueous polysaccharide blend and wherein the highest molecular weight polysaccharide components of the mixture are characterized by a significant molecular weight reduction; and
   (d) drum drying the aqueous polysaccharide blend to yield the polysaccharide product.

10. A product produced by the method of claim 9.

11. A method for producing a polysaccharide product from a starch and a natural gum comprising the following steps:
   (a) mixing the starch and the natural gum with water to form an aqueous mixture; and
   (b) excess-steam jet cooking said mixture to produce an aqueous blend of completely solubilized polysaccharide components from the starch and the natural gum.

12. A method as described in claim 11 wherein said starch is an unmodified starch.

13. A method as described in claim 11 wherein said natural gum is selected from the group consisting of guar gum and konjac gum.

14. A method as described in claim 11 wherein said natural gum is selected from the group consisting of xanthan gum, locust bean gum, carrageenan, and carboxymethyl cellulose.

15. A method as described in claim 11 wherein the aqueous solution in step (a) is formed by first dry-mixing the starch and the natural gum and then admixing the resultant dry mix with water to form an aqueous mixture.

16. A method as described in claim 11 wherein the dry weight ratio of starch:natural gum in said aqueous mixture is in the range of about 99:1 to about 90:10.

17. A product produced by the method of claim 11.

18. A method as described in claim 11 and further comprising the step of drying the aqueous blend to form a solid.

19. A method as described in claim 11 and further comprising the step of drum drying the aqueous blend to form a solid.

20. A product produced by the method of claim 19.

21. A method for producing a polysaccharide product from a starch and a natural gum comprising mixing completely-solubilized polysaccharide components of excess-steam jet cooked starch with completely-solubilized polysaccharide components of excess-steam jet cooked natural gum to produce a blend of all of said components.

22. A product produced by the method of claim 21.

* * * * *